United States Patent [19]

Myerson et al.

[11] Patent Number: 5,683,488
[45] Date of Patent: *Nov. 4, 1997

[54] METHOD FOR PRODUCING AN IRON FEEDSTOCK FROM INDUSTRIAL FURNACE WASTE STREAMS

[75] Inventors: Allan S. Myerson, Brooklyn, N.Y.; Charles A. Burrows, Atlanta; Paul R. DiBella, Ball Ground, both of Ga.

[73] Assignee: Metals Recycling Technologies Corp., Atlanta, Ga.

[*] Notice: The term of this patent shall not extend beyond the expiration date of Pat. No. 5,571,306.

[21] Appl. No.: 665,043

[22] Filed: Jun. 7, 1996

Related U.S. Application Data

[63] Continuation of Ser. No. 348,446, Dec. 2, 1994, abandoned, which is a continuation-in-part of Ser. No. 238,250, May 4, 1994, Pat. No. 5,464,596, which is a continuation-in-part of Ser. No. 953,645, Sep. 29, 1992, abandoned, which is a continuation-in-part of Ser. No. 820,987, Jan. 15, 1992, Pat. No. 5,208,004.

[51] Int. Cl.⁶ .............................. C22B 7/02; C22B 3/14; C22B 3/46
[52] U.S. Cl. .............................. 75/420; 75/724; 75/725; 75/961; 204/604; 423/108
[58] Field of Search .............................. 75/420, 430, 753, 75/961, 724, 725; 204/604; 423/108

[56] References Cited

U.S. PATENT DOCUMENTS

| | | | |
|---|---|---|---|
| 3,849,121 | 11/1974 | Burrows | 75/103 |
| 4,071,357 | 1/1978 | Peters | 75/103 |
| 4,155,821 | 5/1979 | Grontoft | 204/113 |
| 4,292,147 | 9/1981 | Fray et al. | 204/118 |
| 4,376,043 | 3/1983 | Heijwegen et al. | 75/961 |
| 5,208,004 | 5/1993 | Myerson | 423/622 |
| 5,464,596 | 11/1995 | Myerson | 75/724 |
| 5,571,306 | 11/1996 | Myerson et al. | 75/430 |

FOREIGN PATENT DOCUMENTS

| | | |
|---|---|---|
| 0 227 024 | 12/1986 | European Pat. Off. . |
| 1 568 362 | 10/1976 | United Kingdom . |
| 1 600 022 | 10/1981 | United Kingdom . |

OTHER PUBLICATIONS

Direct Reduced Iron Iron & Steel Society Aug. 1982, TN 707 D56 p. 45.

Olper, M., "The EZINEX Process–A New And Advanced Way For Electrowinning Zinc From A Chloride Solution", International Symposium–World Zinc, Oct. 1993.

*Primary Examiner*—Melvyn Andrews
*Attorney, Agent, or Firm*—Deveau, Colton & Marquis

[57] ABSTRACT

A method for the recovery of iron products, specifically direct reduced iron and iron oxide suitable for use as the feedstock for steel mills, from industrial waste streams containing iron, by treating the waste streams with an ammonium chloride leaching solution, separating the undissolved precipitates comprising iron compounds from the leachant solution, and further treating the undissolved precipitants by elevated temperature roasting, resulting in the iron feedstocks.

12 Claims, No Drawings

METHOD FOR PRODUCING AN IRON FEEDSTOCK FROM INDUSTRIAL FURNACE WASTE STREAMS

STATEMENT OF RELATED APPLICATIONS

This application is a continuation of application Ser. No. 08/348,446 filed on Dec. 2, 1994, abandoned, which is a continuation-in-part of application Ser. No. 08/238,250 filed on May 4, 1994, which issued as U.S. Pat. No. 5,464,596 on Nov. 7, 1995, which is a continuation-in-part of application Ser. No. 07/953,645 filed on Sep. 29, 1992, abandoned, which is a continuation-in-part of application Ser. No. 07/820,987 filed on Jan. 15, 1992, which issued as U.S. Pat. No. 5,208,004 on May 4, 1993.

BACKGROUND OF THE INVENTION

1. Field of the Invention

The present invention relates generally to a process for the recovery of usable economically valuable products, including a relatively pure iron or direct reduced iron product and, optionally, an iron oxide and an iron-carbon residual, from industrial waste streams typically comprising zinc compounds and iron compounds. The present invention relates more specifically to a process in which a waste materials stream typically comprising zinc compounds and iron compounds, such as electric arc furnace (EAF) dust, is subjected to a combination of steps including leaching, resulting in a precipitate comprising iron oxides, which then is subjected to roasting, resulting in a direct reduced iron compound which can be used as a feedstock for steel mills. Preferably, the precipitate containing iron oxides is removed from a process for the recovery of zinc oxide and zinc metal from industrial waste streams. During the recovery process, carbon compounds can be added to the waste stream, and a cake product produced from the undissolved iron and carbon compounds, which also can be used as a feedstock for steel mills.

2. Prior Art

Industrial waste streams typically contain components which have economic value if they can be recovered in an economic fashion. For example, U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out and discard the iron oxides and waste metals, so that the resulting zinc-compound-rich solution can be further treated to recover the zinc compounds.

Waste metal process dust typically has varying amounts of iron, lead, cadmium and other metals, in various forms, contained in the dust. The first step in the Burrows patent is the treating of the EAF dust with an ammonium chloride solution to leach any zinc oxide, lead oxide and cadmium oxide present in the dust into solution, without any leaching of the iron oxides present. The second step in the Burrows process is cementation in which the solution obtained from the initial leach is filtered to remove any remaining solids and then zinc dust is added. The third step in the Burrows patent then takes the filtrate from the cementation process and cools the filtrate and obtains what are called zinc oxide crystals. The Burrows patent does not teach the treatment or recovery of any values from the discarded iron oxide containing precipitates.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium. However, Peters does not disclose a method for further treating the removed components not containing zinc compounds.

Thus, there exists a need for a method which will allow the recovery of an iron product from industrial waste streams which can be subjected to further treatments, resulting in a relatively pure iron product, such as direct reduced iron, which can be used as the feedstock for other processes. Producing an iron product with a minimum amount of impurities, such as zinc ferrite, is advantageous because the iron product can be used as the feedstock for steel production processes. A method which results in the recovery of an iron product would have additional value in that the iron product could be sold for use in other processes.

BRIEF SUMMARY OF THE INVENTION

The present invention satisfies these needs in a method which recovers a relatively pure iron product from waste materials from industrial processes, such as electric arc furnaces, typically containing zinc or zinc oxide. The non-iron solids and feed and product solutions used and/or produced in the process can be recycled such that the process has minimal solid or liquid wastes. Other solids can be recovered by treating other compounds in the waste materials, for example zinc oxide, zinc, metal values, and other residues, all of which can be used in other processes.

Briefly, the waste material, typically a fly ash or flue dust such as EAF, is leached with an ammonium chloride solution resulting in a product solution (leachate) and undissolved materials (precipitate). In the leaching step, the zinc and/or zinc oxide dissolves in the ammonium chloride solution along with other metal oxides contained in the waste material, such as lead oxide and cadmium oxide. The resultant solution is filtered to remove the undissolved materials, including iron oxides and inert materials such as silicates, which will not dissolve in the ammonium chloride solution. The product solution and the undissolved materials are separated, with both the product solution and the undissolved materials being further treated to recover valuable components. For example, the remaining product solution can be treated to produce a zinc oxide product of 99% or greater purity. Alternatively, the remaining product solution can be subjected to electrolysis in which zinc metal plates onto the cathode of the electrolysis cell. Any remaining product solution after crystallization or electrolysis can be recycled back to treat incoming waste material.

The undissolved material separated from the product solution is rich in iron oxides, and typically has some impurities such as zinc ferrite. The undissolved materials can be used without further treatment as a feedstock for steel mills so long as the quantity of impurities is not too great. It is preferable, however, to remove the impurities from the iron oxide prior to using the iron oxide as a feedstock. Even more preferably, reducing the iron oxide to direct reduced iron (DRI) is desired as DRI can be used to replace part or all of the steel scrap charge.

The iron oxide in the undissolved materials can be reduced to DRI in several manners. First, the undissolved materials may be subjected to a high temperature roasting step, preferably in the 980° C. to 1315° C. range, to reduce the iron oxide present in the undissolved materials to direct reduced iron. Roasting at this elevated temperature oxidizes and/or dirves off the vast majority of the remaining impurities. To assist in the formation of a more usable direct reduced iron, the undissolved materials can be pelletized with carbon or sodium silicate, or another suitable material, at the end of or after the roasting step. Second, carbon, in the form of activated carbon, carbon dust, carbon pellets or the like, can be introduced to the ammonium chloride and waste material mixture during the leaching process. Third, carbon can be introduced to the dried undissolved material cake. When the iron oxide and carbon are heated under a reducing atmosphere, such as CO or $CO_2$ or other common reducing gases, the carbon will react with the iron oxide, assisting in reducing the iron oxide to DRI. Combining any of these methods can result in an even purer direct reduced iron product.

Prior to being leached by the ammonium chloride solution, the waste material mixture, which typically includes franklinite and magnetite, may be preroasted at temperatures greater than 500° C. for a predetermined period of time. The preroasting causes a decomposition of the franklinite zinc oxide-iron oxide complex into zinc oxide, iron oxide and other components. The preroasting process generally comprises the steps of adding heat to the waste material mixture and/or passing heated reducing gases through the waste material mixture. Although all reducing gases are suitable, hydrogen and carbon-containing gases such as carbon dioxide are preferred, as well as mixing carbon (activated) with the waste material mixture and preroasting in a gas containing oxygen. While some iron oxide is reduced from $Fe_2O_3$ and $Fe_3O_4$ to FeO, no elemental iron is produced during the preroasting step. Additionally, iron and iron oxides are not soluable to any degree in the basic ammonium chloride solution.

Therefore, it is an object of the present invention to provide a method for recovering an iron product from waste materials, such as fly ash or flue dust, which contain iron oxide.

An additional object of the present invention is to provide a method for recovering an iron product from a waste material stream which has been leached with ammonium chloride.

Still another object of the present invention is to provide a method for recovering iron oxide from waste materials, such as fly ash or flue dust, which contain other metals, such as zinc, lead oxide, and cadmium.

A further object of the present invention is to provide a method for recovering iron oxide which can be used as is as a feedstock for steel production processes.

Another object of the present invention is to provide a method for producing direct reduced iron from iron oxide recovered as a residue from an ammonium chloride leached waste material, such as fly ash or flue dust.

A final object of the present invention is to provide a method for recovering an iron product such as direct reduced iron and/or iron oxide which is economical, quick and efficient.

These objects and other objects, features and advantages of the present invention will become apparent to one skilled in the art after reading the following Detailed Description of a Preferred Embodiment.

DETAILED DESCRIPTION OF A PREFERRED EMBODIMENT

By taking an iron cake comprising for the most part iron oxides, and roasting it at elevated temperatures under a reducing atmosphere, a product can be made which is equivalent to direct reduced iron. In general terms, heating the iron cake up to about 1260° C., and typically no higher than 1315° C., a direct reduced iron product is formed. This direct reduced iron product then can be pelletized with carbon or with a sodium silicate, or other suitable compound, after it comes out of the furnace. The final product then can be used as a feedstock for steel mills without any additional treatment.

As discussed below, the additional step of roasting the iron cake, which is the undissolved precipitate, to reduce the iron oxide and to drive off any zinc, cadmium, and lead, and other impurities, is added to the end of a zinc oxide recovery process. The resulting iron product may have been reduced from several forms of the iron, such as FeO, $Fe_2O_3$, or $Fe_3O_4$, reduced to an iron extremely usable as the feedstock for steel mills.

The waste material, such as the flue dust, is leached, and the remaining undissolved precipitate is, for the most part, an iron oxide cake. During the roasting of the undissolved precipitate, the bond to the non-leachable zinc oxide-iron oxide complex, franklinite, contained in the undissolved precipitate is broken, and the zinc oxide compounds are exhausted in the off gas and captured in a pollution control device, such as a baghouse, leaving the iron oxide cake as the residue. The iron oxide cake is roasted at an elevated temperature, causing the reduction of the iron oxide, leaving the iron metal values. The iron then can be mixed with a binder and formed into briquettes or cubes to be used as the feedstock. The exhausted impurities then can be recycled to recover, for example, zinc oxide, cadmium metal, and lead metal.

The method for recovering an iron product disclosed herein is carried out in its best mode in recovering the material from the waste streams of industrial or other processes. A typical industrial waste stream used is a flue gas where the charge contains galvanized steel, having the following percent composition:

TABLE I

| Analysis of Flue Dust | |
|---|---|
| Component | Percent By Weight |
| Zinc Oxide | 39.64 |
| Iron Oxide | 36.74 |
| Lead Oxide | 5.72 |
| Inert Materials | 9.10 |
| Calcium Oxide | 2.80 |
| Potassium Oxide | 2.41 |
| Manganese Oxide | 1.29 |
| Tin Oxide | 1.13 |
| Aluminum Oxide | 0.38 |
| Magnesium Oxide | 0.33 |
| Chromium Oxide | 0.16 |
| Copper Oxide | 0.06 |
| Silver | 0.05 |
| Unidentified Materials | 0.22 |

GENERAL PROCESS DESCRIPTION

Generally, the present process is a continuous method for the recovery of iron products from waste material streams. The basic process steps comprise:

Basic Process Steps a. treating the waste material with an ammonium chloride solution at an elevated temperature to form a product solution and an undissolved precipitate comprising iron oxide;

b. separating the product solution from the undissolved precipitate comprising the iron oxide;

c. further treating the undissolved precipitate in a roasting process resulting in the recovery of a relatively pure iron product.

To these basic process steps, a number of additional steps may be added depending on the process conditions and direct reduced iron properties desired. The additional steps include, either individually or in some combination:

1. preroasting the waste material at an elevated temperature;

2. preroasting the waste material at an elevated temperature and in a reducing atmosphere;

3. pretreating the waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere, and then treating the undissolved precipitate with an ammonium chloride solution at an elevated temperature to form a product solution and an undissolved precipitate comprising iron oxide, and separating the product solution from the undissolved precipitate; and/or 4. preroasting the waste material at an elevated temperature and optionally in a reducing atmosphere, pretreating the waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere, and then treating the undissolved precipitate With an ammonium chloride solution at an elevated temperature to form a product solution and an undissolved precipitate comprising iron oxide, and separating the product solution from the undissolved precipitate.

To these basic process steps, additional iron product purification steps may be added. For example:

1. elemental carbon can be added during the leaching step or steps to initiate the reduction of the iron oxide into direct reduced iron during the leaching step or steps. The elemental carbon may be added in a number of forms including, but not limited to, dust, granules, and pellets. The elemental carbon does not go into solution and remains with the undissolved precipitate.

2. elemental carbon can be added to the undissolved precipitate after it has been separated from the product solution. Combining elemental carbon and iron oxide in this manner at an elevated temperature and under a reducing atmosphere also will initiate the reduction of the iron oxide into direct reduced iron. The elemental carbon can be mixed into the undissoved precipitate in a number of manners including, but not limited to ribbon blenders and mixers.

PREROASTING PROCESS

The preroasting step, as mentioned above, can be carried out prior to the initial leaching step, or between a first and second leaching step, or both. The powder containing the franklinite and magnetite, such as the waste dust, is heated to temperatures greater than 500° C. This temperature causes a reaction which causes a decomposition of the stable franklinite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc.

The dust can be preroasted using many conventional roasting processes, such as, for example, direct or indirect heating and the passing of hot gases through the dust. For example, non-explosive mixtures of reducing gases, such as hydrogen gas and nitrogen or carbon dioxide, can be passed through the powder containing franklinite and magnetite. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

After the dust has been preroasted, it is subjected to a leaching step in 23% by weight ammonium chloride solution in water at a temperature of at least 90° C. Any zinc or zinc oxide formed during the preroasting step dissolves in the ammonium chloride solution. The zinc oxide and ammonium chloride solution then is filtered to remove the undissolved material, including the iron oxide.

LEACHING TREATMENT

An ammonium chloride solution in water is prepared in known quantities and concentrations. If the two-stage leaching process is used, the feed material, such as the waste material flue dust described in Table I or any other feed material source which contains iron oxide mixed with other metals, is added to the ammonium chloride solution at a temperature of about 90° C. or above. Otherwise, the feed material first is roasted. The majority of the waste material mixture, including any zinc and/or zinc oxide, lead oxide, cadmium oxide, and other metal oxides, dissolves in the ammonium chloride solution. The iron oxide does not dissolve in the ammonium chloride solution. As an example, the solubility of zinc oxide in ammonium chloride solutions is shown in Table II.

TABLE II

| Solubility of ZnO in 23% $NH_4Cl$ solution | |
|---|---|
| Temperature °C. | g Dissolved/100 g $H_2O$ |
| 90 | 14.6 |
| 80 | 13.3 |

TABLE II-continued

Solubility of ZnO in 23% NH₄Cl solution

| Temperature °C. | g Dissolved/100 g H₂O |
|---|---|
| 70 | 8.4 |
| 60 | 5.0 |
| 50 | 3.7 |
| 40 | 2.3 |

It has been found that a 23% by weight ammonium chloride solution in water at a temperature of at least 90° C. provides the best solubility for a waste stream comprising a significant quantity of zinc oxide. Concentrations of ammonium chloride below about 23% do not dissolve the maximum mount of zinc oxide from the flue dust, and concentrations of ammonium chloride above about 23% tend to precipitate out ammonium chloride along with the zinc oxide when the solution is cooled. Therefore, 23% has been chosen as the preferred ammonium chloride solution concentration. The iron oxide and inert materials such as silicates will not dissolve in the preferred solution.

The zinc oxide, as well as smaller concentrations of lead or cadmium oxide, are removed from the initial dust by the dissolution in the ammonium chloride solution. The solid remaining after this leaching step contains iron oxides and some impurities including zinc, lead, cadmium, and possibly some other impurities. The remaining solid then can be roasted in a reducing atmosphere, typically at a temperature greater than 420° C. and often at 700° C. to 900° C. The reducing atmosphere can be created by using hydrogen gas, simple carbon species gases such as carbon dioxide, or by heating the material in an oxygen containing gas in the presence of elemental carbon. The carbon preferably is in the form of dust or pellets. Typical preroasting times are from 30 minutes to 4 hours. As discussed above, the waste dust first may be preroasted and second may be leached, omitting the first leaching step.

OPTIONAL CARBON ADDITION STEP

The present process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, as previously discussed, it becomes more valuable if reduced by reaction with elemental carbon to produce an iron-carbon or direct-reduced iron product. One preferred method for producing such an iron-carbon or direct-reduced iron product from the waste material comprises the steps of:

a. treating the waste material with an ammonium chloride solution at an elevated temperature to form a product solution which comprises dissolved zinc and dissolved zinc oxide whereby any iron oxide in the waste material will not go into solution;

b. adding carbon to the product solution whereby the carbon will not go into solution; and then c. separating the product solution from the undissolved materials present in the product solution including any of the iron oxide and the carbon.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron oxide cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron oxide cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process.

Combining carbon and iron oxide in a reducing atmosphere and at an elevated temperature results in the reduction of the iron oxide, producing direct-reduced iron (DRI). DRI can be used to replace part or all of the steel scrap charged to a steel mill. In some operations, DRI is preferred to scrap because it has a known uniform composition and generally contains no residual elements such as chromium, copper, nickel, and tin. When carbon-enriched iron oxide is melted, it forms a desired foamy slag because it contains both carbon and iron oxide. Because the price of steel scrap usually is lower than DRI, the use of DRI usually cannot be economically justified. DRI typically runs in the $120.00 per ton range. However, since the iron oxide is a residual product of an economical recovery process, such as the recovery of zinc oxide from flue dust described generally below, with the main value of the process being from the zinc oxide product, the iron oxide or direct-reduced iron can be produced more economically. Therefore, the iron oxide produced as a residual in this process has significant value.

Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+ of material would be product solution which, if the cake is used as a feedstock to a steel mill, would be reintroduced to the steel-making process, which is uneconomical. Likewise, drying the cake to have more than 86% solids can be uneconomical.

The roasting process produces vapors, from the zinc, lead and cadmium and other impurities, that have to be condensed into dust. These impurities can be sent to the baghouse at the end of the steel making process, mixed into the original waste dust, and then sent to the first leaching step, in a recycle fashion. Alternatively, the exhaust vapors and dust from the roasting step may be sent to a separate baghouse at a stand alone facility.

There are two preferred ways to add carbon to the iron oxide cake. First, it may be beneficial when the iron oxide cake comes out of the reclamation process to grind up the iron oxide cake, pelletize it with carbon and put it in a roasting furnace. Second, carbon can be added to the furnace with the iron oxide.

The iron oxide cake can be treated in three manners. First, carbon can be added to the leaching step and the iron oxide cake will have carbon plus iron oxide. The iron oxide-carbon cake can go directly to the steel mill and, if it goes directly to the steel mill, then the reduction of the iron oxide would take place in the steel mill furnace. Second, the iron oxide-carbon cake can be pelletized and roasted to form direct reduced iron. The iron oxide precipitate, which typically contains around 80% solids, is ground up with carbon and formed into pellets, briquettes or cubes and then heated. These pellets, briquettes or cubes then can be introduced to a steel making furnace. The difference in the material that would be introduced to the furnace from the first manner and the second manner is that in the second manner, direct reduced iron is introduced to the steel making furnace, while in the first manner, a combination of iron oxide and carbon is introduced to the steel making furnace. The iron oxide plus carbon can be supplied to the steel mill as is. When this carbon enriched iron oxide is melted, it forms a foamy slag, and a foamy slag is desirable in steel making. Third, the carbon can be added through a ribbon blender, and then the iron oxide-carbon cake can be introduced either directly into the furnace or, preferably roasted first toform direct reduced iron, which would be preferred for steel making.

In order of preference, the first manner is the least preferable, that is adding the material itself as a mixture of carbon and iron oxide without any reducing agents mixed in with it. The second most preferable is the third manner, adding the material with carbon added to it either through the leaching step or through a ribbon blender and put directly into the furnace. The most preferable is the second manner, where carbon is added either though the leaching step or a ribbon blender, pelletizing or briquetting it, roasting it, and introducing it to the steel furnace.

EXAMPLES

The following Examples are taken from data demonstrating ways to increase the formation of zinc oxide from the product solution produced according to the present invention. Examples 1 and 2 do not include roasting and Examples 3 and 4 include roasting. The Examples are intended to illustrate the initial treatment of the waste material stream, including the leaching treatment and the initial waste material stream roasting, if employed.

EXAMPLE 1

Prior Art

A metal dust of composition listed in Table I of the Burrows patent is added to 23% by weight $NH_4Cl$ solution (30 g $NH_4Cl$ per 100 g $H_2O$), as discussed in the Burrows patent, in the amount of 1 gram of dust per 10 grams of solution. The solution is heated to a temperature of 90° C. and stirred for a period of 1 hour, during which the zinc oxide in the dust dissolves. The remaining solid, which has a composition of approximately 60% iron oxide, 5% calcium oxide, 5% manganese, 30% other materials, is filtered out of the solution. This remaining solid is further treated according to the invention to recover feedstock grade direct reduced iron or iron oxide.

EXAMPLE 2

A metal dust of composition listed in Table I is added to 23% weight $NH_4Cl$ solution (30 g $NH_4Cl$ per 100 g $H_2O$). 1 gram of dust is used per 10 grams of solution. The solution is heated to a temperature of 90° C. and stirred for a period of 1 hour. During this period the zinc oxide in the dust dissolves. The remaining solid, having a composition of approximately 60% iron oxide, 5% calcium oxide, 5% manganese, 30% other materials, is filtered out of the solution. This remaining solid is further treated according to the invention to recover feedstock grade direct reduced iron or iron oxide.

EXAMPLE 3

A dust containing 19.63% Zn, 27.75% Fe, 1.31% Pb, 9.99% Ca, and 0.024% Cd (analysis based on elements not oxides) was leached at 100° C. in a 23% ammonium chloride solution. The solid remaining after the leaching process was dried and analyzed to contain 12.67% Zn, 4.6% Ca, 35.23% Fe, 0.7% Pb, and 0.01% Cd. This material was placed in a quartz boat in the presence of activated carbon and heated at 900° C. for two hours in an atmosphere of 95% $N_2$ and 5% $O_2$. After two hours, the material was removed and added to a 23% ammonium chloride solution at 100° C. The material was filtered and dried at 140° C. for one hour to determine its composition. Analysis of this remaining solid was 42.84% Fe, 0.28% Zn, <0.1% Pb, and <0.01% Cd. This remaining solid is further treated according to the invention to recover feedstock grade direct reduced iron or iron oxide.

EXAMPLE 4

A dust with the composition given in Table I is leached in 23% ammonium chloride solution for 1 hour at 100° C. The solid remaining (which contained 14% Zn) was placed in a quartz boat and heated to 700° C. in an atmosphere of 8% $H_2$ and 92% Ar. The material was cooled and reheated at 100° C. in 23% ammonium chloride solution at 100° C. The solid was separated, dried and analyzed for zinc. The zinc was found to be less than 1%. The leached-roasted-leached material then can be subjected to the remainder of the general process.

OPTIONAL RECOVERY OF ZINC OXIDE FROM PRODUCT SOLUTION

To recover the zinc oxide from the product solution, while the filtered zinc oxide and ammonium chloride solution is still at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water. The solubility of diamino zinc dichloride in water is shown in Table III.

TABLE III

Solubility of $Zn(NH_3)_2Cl_2$ in water

| Temperature °C. | g Dissolved/100 g $H_2O$ |
|---|---|
| 90 | 32 |
| 80 | 24 |
| 40 | 21 |
| 25 | 12.8 |

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful. The drying temperature should be kept below approximately 350° C. to prevent the sublimation of significant amount of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step of the present process can be done continuously in order to increase the throughput and maximize the zinc oxide yield after the washing and drying step.

OPTIONAL PREROASTING STEP FOR ENHANCED ZINC RECOVERY

The zinc dust obtained from various sources have shown by chemical analysis to contain from 20%–25% zinc by weight. X-ray diffraction indicates clearly the existence of certain crystalline phases in this dust, specifically zinc oxide. The positive identification of the iron phase is complicated by the possible structural types (i.e. spinel type iron phases showing almost identical diffraction patterns). The zinc oxide (as well as smaller concentrations of lead or cadmium oxide) are removed from the initial dust by dissolution in a concentrated ammonium chloride solution (23% ammonium chloride).

Filtration and washing of the undissolved species leaves a residual powder. This powder shows a zinc concentration that is still elevated (i.e., 10–13% by weight), but that is not zinc oxide. X-ray diffraction indicates that all crystalline phases can be identified by spinel type phases. The combination of chemical analysis and x-ray diffraction indicates that this powder is a combination of magnetite (iron oxide: $Fe_3O_4$). Both of these phases have very similar spinel type structures. The zinc within the franklinite, (Fe, Mn, Zn)$(FeMn)_2O_4$, cannot be removed by dissolution with ammonium chloride. In addition, no simple extraction process will remove zinc from this stable oxide phase. Although this compound is very stable to oxidation (all elements in the highest oxidation state), it is relatively easy to destroy this compound by reduction at elevated temperatures. The reduction of the franklinite in an atmosphere that cannot readily reduce zinc oxide or allow for the rapid oxidation of zinc to zinc oxide following reduction and subsequently recover the zinc oxide by ammonium chloride extraction or sublimation (the highly volatile zinc oxide will sublime from the mixture at relatively low temperatures and recondense at the cold locations of the roaster). The alternative will be complete reduction of the franklinite to zinc metal and removal by distillation or separation of the molten zinc by settling techniques. This can be accomplished by including the preroasting step disclosed above.

The above detailed description of a preferred embodiment is for illustrative purposes only and is not intended to limit the spirit or scope of the invention, or its equivalents, as defined in the appended claims.

What is claimed is:

1. A continuous method for the recovery of iron products from waste material streams which comprise iron oxides, zinc, lead, and cadmium, comprising the steps of:

a. combining said waste material with carbon and preroasting said waste material at an elevated temperature resulting in the reduction of the iron oxides into direct reduced iron and the production of exhaust vapors comprising zinc, lead, and cadmium compounds;

b. collecting and treating said exhaust vapors with an ammonium chloride solution at an elevated temperature to form a product solution which comprises dissolved constituents and an undissolved precipitate, wherein said dissolved constituents comprise said zinc, lead, and cadmium compounds;

c. separating said product solution from said undissolved precipitate; and d. treating said product solution so as to remove at least a portion of the zinc compounds from said product solution.

2. The method as claimed in claim 1, wherein said undissolved precipitate is roasted at a temperature of between 980° C. and 1315° C.

3. The method as claimed in claim 2, whereto the concentration of said ammonium chloride solution is 23% by weight.

4. The method as claimed in claim 3, wherein said waste materials are preroasted at a temperature of at least 500° C.

5. The method as claimed in claim 4, wherein said waste materials preroasted in a reducing atmosphere.

6. A method as claimed in claim 1, wherein said step of treating said product solution comprises adding zinc metal dust to said product solution resulting in the cementation of said lead and said cadmium.

7. A method as claimed in claim 6, further comprising the step of:

f. cooling said product solution resulting in the crystallization of zinc compounds.

8. A method as claimed in claim 6, further comprising the step of:

f. further treating said product solution by electrolysis to remove at least a portion of any remaining zinc component from said product solution as elemental zinc.

9. A method as claimed in claim 1, wherein said product solution is treated to remove the zinc component by electrolysis thereby removing at least a portion of the zinc component from said product solution as elemental zinc.

10. A method as claimed in claim 1, wherein said zinc component removed from said product solution is recovered as a zinc value.

11. A method as claimed in claim 1, further comprising the step of roasting said undissolved precipitate at an elevated temperature.

12. A continuous method for the recovery of iron products from waste materials which comprise iron oxides, zinc, lead, and cadmium, comprising the steps of:

a. roasting said waste material at a temperature of at least 500° C. and in a reducing atmosphere comprising carbon resulting in the reduction of the iron oxides into direct reduced iron and the production of exhaust vapors comprising zinc, lead, and cadmium compounds;

b. collecting and treating said exhaust vapors with a 23% ammonium chloride solution maintained at a temperature of at least 90° C. to form a product solution which comprises dissolved constituents and an undissolved precipitate, wherein said dissolved constituents comprise said zinc, lead, and cadmium compounds;

c. separating said product solution from said undissolved precipitate;

d. roasting said undissolved precipitate at a temperature of between 980° C. and 1315° C.;

e. adding zinc metal dust to said product solution resulting in the cementation of said lead and said cadmium; and f. cooling said product solution resulting in the crystallization of zinc compounds.

* * * * *

UNITED STATES PATENT AND TRADEMARK OFFICE
CERTIFICATE OF CORRECTION

PATENT NO. : 5,683,488  
DATED : November 4, 1997  
INVENTOR(S) : Myerson, et al.

It is certified that error appears in the above-identified patent and that said Letters Patent is hereby corrected as shown below:

Delete Column 14, lines 30-36, and substitute therefor,

-- d.  adding zinc metal dust to said product solution resulting in the cementation of said lead and said cadmium; and e.  cooling said product solution resulting in the crystallization of zinc compounds. --.

Signed and Sealed this

Fourteenth Day of August, 2001

*Attest:*

NICHOLAS P. GODICI  
*Attesting Officer*     Acting Director of the United States Patent and Trademark Office